Feb. 6, 1968 R. D. BAXTER 3,367,182
HEAT FLUX MEASURING SYSTEM
Filed June 2, 1965
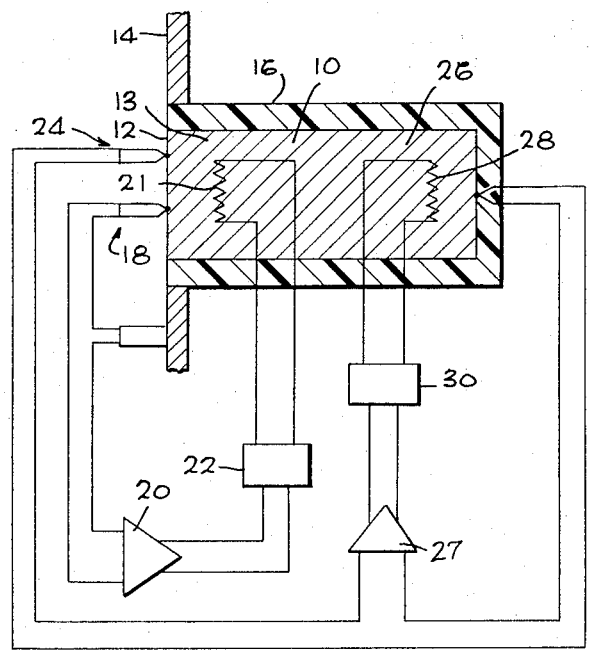
RICHARD D. BAXTER
INVENTOR.
BY Q H McCoy
Charles C. Wells
ATTORNEYS United States Patent Office 3,367,182
Patented Feb. 6, 1968

3,367,182
HEAT FLUX MEASURING SYSTEM
Richard D. Baxter, Lancaster, Calif., assignor to the United States of America as represented by the Administrator of the National Aeronautics and Space Administration
Filed June 2, 1965, Ser. No. 460,877
4 Claims. (Cl. 73—190)

The invention described herein may be manufactured and used by or for the Government of the United States of America for governmental purposes without the payment of any royalties thereon or therefor.

This invention relates generally to heat measuring devices for measuring the net quantity of heat flux inflow to a surface. More particularly the invention is a heat flux sensor adapted to be mounted in a research aircraft for determining the heat flux inflow due to aerodynamic heating to the skin of an aircraft or space vehicle.

Prior art devices employed heretofore for measuring heat flux inflow to a surface, particularly an aerodynamic surface, have generally consisted of calorimeter type devices mounted flush with the aerodynamic surface to which the heat input is to be measured. These calorimeters usually consist of a disc of material composed of a material such as copper that rapidly conducts heat and a thermocouple attached to the inner side of the disc. Suitable voltage reading and recording means are connected to the thermocouple for measuring the current output of the thermocouple from which the temperature of the disc can be determined. The disc and thermocouple are usually housed in a jacket of some type and the entire assembly is secured to the vehicle. These devices while functioning satisfactorily in many applications are not adequate for making the precise measurements required in very sophisticated high speed research aircraft, such as the X-15 aircraft, due to the introduction of distortion in the surface temperatures in the area of the sensor. It is readily apparent that this is objectionable since the distortion would occur in the area where measurements were being taken.

A device constructed in accordance with the principles of the present invention provides a heat measuring device capable of operating in a very severe heating environment without introducing any appreciable surface temperature distortion in the area of the sensor and supplying precise measurements of the heat flux inflow to the surface of a research vehicle. The device consists, briefly, of a thermally symmetrical rod-shaped sensor mounted in the aircraft such that one end surface hereof is positioned substantially flush with the aerodynamic surface to which the heat flux inflow is to be measured. The sensor body is well insulated from the surrounding environment except for the exposed surface thereof. The sensor device includes a first heating circuit that detects any temperature differential between the skin of the vehicle and the exposed end of the sensor body and delivers a heating current to a heater positioned in the exposed end of the sensor body. The purpose of this first circuit is to raise the temperature of the exposed end of the sensor body to the temperature of the skin. By maintaining the exposed end of the sensor at skin temperature it is possible to avoid introducing surface temperature distortion in the area of the sensor. A second heating circuit is employed to measure any temperature differential between the exposed end of the rod and the other end thereof, and provide heater current to a heater positioned in the other end of the sensor body. The second heating circuit functions to raise the temperature of the other end of the rod to that of the exposed end of the rod which would be at skin temperature. Suitable means are also included in the device for monitoring the power input to the heaters and thus the heat input to each end of the rod. The net heat input to the vehicle surface is then obtained by subtracting the heat input into the exposed end of the sensor body from the heat input into the other end of the body as will be more fully described hereinafter.

It is therefore a principal object of this invention to provide a device capable of accurately measuring the net quantity of heat flux inflow to a surface.

Another object of this invention is to provide a heat flux sensor for measuring the total heat flux inflow due to aerodynamic heating to a surface of a high speed flight research vehicle.

A further object of this invention is to provide a heat flux sensor for aerodynamic vehicles that is lightweight, rugged and yet capable of very precise measurements.

Another object of this invention is to provide a heat flux sensor whose presence in a surface will not introduce any appreciable surface temperature distortion in the area of the sensor.

Other objects and advantages of the invention will become more apparent by considering the following detailed description in conjunction with the attached drawing that includes a schematic showing of the heat flux sensor mounted flush with a surface whose heat input is to be measured.

Referring now to the drawing, there is illustrated a sensor body 10 composed of a thermally symmetrical rod of silver or other suitable material. The sensor is suitably secured in a space vehicle, by means not shown, such that end surface 12 of rod end 13 is substantially flush with skin 14 of the vehicle. A layer of insulation 16 is mounted around the sensor body so that all surfaces thereof, with the exception of exposed end surface 12, are insulated from the ambient environment.

A first thermocouple 18 is connected to end 13 of the sensor body and also to the skin of the vehicle at a point adjacent to the sensor body. Thermocouple 18 functions to detect any temperature differential between the skin and end 13 of the sensor body and when a temperature differential exists, the thermocouple will generate an error signal. This error signal is fed into amplifier 20 and the amplifier delivers heating current to heater 21 proportional to the error signal generated by the thermocouple. Heater 21 is a resistance type heater imbedded in the sensor body at a position closely adjacent end surface 12 to raise the temperature of the end 13 of the sensor body to that of the vehicle skin.

A heat rate sensor 22 connected between amplifier 20 and heater 21 functions to measure, and record if desired, the power input into the heater. Heat rate sensors which will accomplish this function are well known in the art and generally include a means for measuring the voltage drop across the heater, the current passing through the heater, and appropriate electronic apparatus for multiplying the voltage drop and current to obtain the power input to the heater. The heat rate sensor can also include suitable recording apparatus for making a permanent record of the power input to the heater or, if desired, means can be provided for telemetering the power input to the heater.

A second thermocouple 24 is connected to end 13 of the sensor body and also to opposite end portion 26 of the sensor body. This thermocouple detects any temperature differential between the two ends of the sensor body and generates an error signal in response thereto. The error signal developed by thermocouple 24 controls an amplifier 27 and the output from amplifier 27 is applied to a heater 28 imbedded in end portion 26 of the sensor body. Heater 28 functions to raise the temperature of end portion 26 of the sensor body to that of the exposed end portion. A second heat rate sensor 30, connected between amplifier 27 and heater 28, is identical to heat rate sensor 22 and performs the same function.

In operation, assuming the heat flux sensor is mounted in an aircraft and the aircraft is in a flight condition wherein the skin temperature of the aircraft is increasing. Aerodynamic heat will be applied to the exposed end of the sensor body and heat will be conducted away from end surface 12 with sufficient rapidity that the end surface will be at a temperature lower than that of the surrounding skin. Thermocouple 18 will detect the temperature differential and generate an error signal proportional thereto. The error signal is applied to the input of the power amplifier and effectively gates the amplifier to allow power from a DC or AC source, included in the power amplifier, to be applied to heater 21 so as to bring the temperature of the exposed end of the rod to that of the vehicle skin. Heat rate sensor 22 connected between power amplifier 20 and heater 21 monitors the heating power applied to the heater from which the heat output of the heater can be determined.

The temperature of the shielded end of the sensor body is maintained at the temperature of the exposed end by a second heater circuit which is identical in structure and operation to that just described and differs only in that thermocouple 24 detects the temperature differential between the two ends of the sensor rather than between the sensor body and the skin.

Thus, the heat input to the shielded end of the thermally symmetrical sensor is the total amount of heat required to maintain the shielded end at skin temperature. In contrast to this, the exposed end of the sensor body requires a lesser amount of heat from heater 21 since a substantial quantity of aerodynamic heating will be present at the exposed end. Thus, since both ends of the thermally symmetric rod require the same amount of heat to be maintained at skin temperature, the amount of aerodynamic heating present can be determined by subtracting the heat output of heater 21 from that of heater 28. Further, since the sensor ends are maintained at skin temperature, the net aerodynamic heat input to the sensor is also that to the skin.

This completes the detailed description of this invention, and while a preferred exemplary embodiment of the invention has been described herein, it should be understood that there will be many changes and modifications thereto which can be made by one skilled in the art to which this invention pertains without departing from the spirit and scope of the invention as defined by the claims appended hereto.

What is claimed is:

1. A heat flux sensor for measuring the heat flux inflow to a surface of a structure, said sensor comprising:
    (a) a thermally symmetric heat conducting body mounted in said structure, said body having a first portion thereof disposed substantially flush with the surface of the structure and a second portion spaced from said structure surface;
    (b) first heat control means connected to said first portion of said body and said structure surface for detecting a temperature differential therebetween and raising the temperature of said first portion to the temperature of the structure surface;
    (c) second heat control means connected to said first and second portions of said body for detecting any temperature differential therebetween and raising the temperature of said second portion to that of said first portion; and
    (d) means included in said heat flux sensor for determining the heating rate required to raise the temperature of said first and second portions of said body.

2. A heat flux sensor for measuring the heat flux inflow to a surface of a structure comprising:
    (a) a thermally symmetric sensor rod mounted in said structure and positioned such that the end surface of one end of said rod is disposed substantially flush with the surface of said structure and the other end of said rod is spaced from the surface;
    (b) a first heat control means connected to said one end of said rod and said structure surface for detecting any temperature differential therebetween and heating said one end of said rod to a temperature equal to that of the surface;
    (c) a second heat control means connected to the other end of said rod for detecting any temperature differential between the ends of said rod and heating the other end of said rod to a temperature equal to that of said one end of said rod;
    (d) insulation means disposed around said rod and covering all surfaces thereof except the end surface disposed flush with the surface of said structure; and
    (e) means included in said sensor for monitoring the heat input to each end of said rod whereby the heat flux inflow to said surface can be determined.

3. A heat measuring system for measuring the heat input to an exterior surface of an aerospace vehicle during flight comprising:
    (a) a solid cylindrical rod mounted in the vehicle, said rod having one end surface thereof mounted flush with the exterior surface of said vehicle;
    (b) a first sensor means connected to said one end of the cylindrical rod and to the exterior surface of said vehicle for detecting any temperature differential therebetween and providing an electrical current whose magnitude is controlled by the temperature differential detected;
    (c) a first heater means mounted in and adjacent to the one end of said cylindrical rod, said heater means being electrically connected to said first sensor means and energized thereby to raise the temperature of the one end of said cylindrical rod to a point equal to that of the exterior surface;
    (d) a second sensor means connected to said one end of said cylindrical rod and also to the other end thereof for detecting any temperature differential therebetween and generating an electrical current whose magnitude is controlled by the temperature differential detected; and
    (e) a second heater means mounted in and adjacent to the other end of said cylindrical rod, said second heater means being electrically connected to said second sensor means and energized thereby to raise the temperature of the other end of said rod to a point equal to that of said one end of said cylindrical rod, and
    (f) means connected between said first and second sensor means and said first and second heaters for determining the heating rate of said first and second heaters.

4. A heat measuring system for measuring the heat input to the exterior surface of an aerospace vehicle during flight, said system comprising:
    (a) a cylindrical rod mounted in said vehicle and positioned such that one end thereof is disposed flush with the outer surface of the vehicle;
    (b) a first thermocouple connected to the one end of said rod and the exterior surface of said vehicle for detecting any temperature difference therebetween and generating a signal proportional thereto;
    (c) a first heater mounted in said cylindrical rod adjacent the one end thereof for increasing the temperature of said one end to equal the temperature of the exterior surface of the vehicle;
    (d) control means connected between said first thermocouple and said first heater means that receives the signal from said first thermocouple and delivers a power output that controls the heat output of said first heater;
    (e) a second thermocouple connected to said one end of said rod and the other end of said rod for detecting any temperature differential therebetween and generating a signal proportional thereto;

(f) a second heater mounted in said rod adjacent the other end thereof for increasing the temperature of the other end of said rod to equal the temperature of the one end of said rod;

(g) control means connected between said second thermocouple and said second heater that receives the signal from said second thermocouple and delivers an output that controls the heat output of said second heater; and (h) means connected between said first and second control means and said first and second heaters for determining the heating rate of the heaters.

References Cited

UNITED STATES PATENTS

| | | | |
|---|---|---|---|
| 2,264,968 | 12/1941 | De Forest | 73—51 |
| 2,911,827 | 11/1959 | Czerlinsky et al. | 73—190 |
| 3,018,663 | 1/1962 | Dunlop | 73—341 |
| 3,123,996 | 3/1964 | Musial | 73—15 |

OTHER REFERENCES

"Measurement—Heat Transfer," in Product Engineering's Design Digest, 35 (26): p. 45, Dec. 21, 1964.

JAMES J. GILL, *Primary Examiner.*

EDDIE E. SCOTT, *Assistant Examiner.*